(12) United States Patent
Nishino et al.

(10) Patent No.: US 8,198,591 B2
(45) Date of Patent: Jun. 12, 2012

(54) COOLING DEVICE AND COOLING METHOD

(75) Inventors: Naoyuki Nishino, Kanagawa (JP); Yasunori Ohta, Kanagawa (JP); Keiji Tsubota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 376 days.

(21) Appl. No.: 12/471,494

(22) Filed: May 26, 2009

(65) Prior Publication Data

US 2009/0294676 A1 Dec. 3, 2009

(30) Foreign Application Priority Data

May 30, 2008 (JP) ................................. 2008-143737

(51) Int. Cl.
*G01T 1/10* (2006.01)

(52) U.S. Cl. .................................................... 250/361 R

(58) Field of Classification Search ........... 250/370.01–370.15; 378/98.8
See application file for complete search history.

(56) References Cited

U.S. PATENT DOCUMENTS

| 2001/0007525 A1* | 7/2001 | Tracy .............................. 361/687 |
| 2006/0026983 A1* | 2/2006 | Tilton et al. ...................... 62/310 |
| 2006/0070384 A1* | 4/2006 | Ertel ................................. 62/3.3 |
| 2007/0292344 A1* | 12/2007 | Turner .......................... 424/1.13 |
| 2009/0154648 A1* | 6/2009 | Watanabe ...................... 378/116 |

FOREIGN PATENT DOCUMENTS

| JP | 58-92797 A | 6/1983 |
| JP | 10-177224 | 6/1998 |
| JP | 2000-116633 | 4/2000 |
| JP | 2002-311526 | 10/2002 |
| JP | 2003-194951 | 7/2003 |
| JP | 2006-102492 | 4/2006 |

OTHER PUBLICATIONS

Japanese Office Action dated Feb. 21, 2012 issued in the corresponding Japanese Patent Application.

* cited by examiner

*Primary Examiner* — Kiho Kim
(74) *Attorney, Agent, or Firm* — Solaris Intellectual Property Group, PLLC (57) ABSTRACT

The present invention provides a cooling device that can cool an electronic device in a short amount of time. When an electronic cassette has been accommodated in a housing device, the cooling device performs heat absorption by spraying an antiseptic liquid from nozzles onto the electronic cassette.

10 Claims, 10 Drawing Sheets

COOLING DEVICE AND COOLING METHOD

CROSS-REFERENCE TO RELATED APPLICATION

This application claims priority under 35 USC 119 from Japanese Patent Application No. 2008-143737, filed May 30, 2008, the disclosure of which is incorporated by reference herein.

BACKGROUND

1. Technical Field

The present invention pertains to a cooling device and a cooling method and particularly relates to a cooling device and a cooling method that cool a portable electronic device.

2. Related Art

In recent years, radiation detectors such as flat panel detectors (FPD) where an X-ray sensitive layer is disposed on a thin-film transistor (TFT) active matrix substrate and which can directly convert X rays into digital data have been put to practical use. Further, portable radiological image conversion devices (also called "electronic cassettes" below) that use these radiation detectors to generate image data representing a radiological image expressed by irradiated radiation and to store the generated image data have been put to practical use.

Since these electronic cassettes are portable, patients lying on a stretcher or a bed can be shot as they are. Further, since the place that is to be shot can be adjusted by changing the position of the electronic cassette, these electronic cassettes can flexibly accommodate patients who cannot move.

These electronic cassettes detect weak signals generated by irradiated radiation and generate image data representing a radiological image. However, it is known the problem that the detection result of the signals is sometimes inconsistent due to the affect of heat generated by electronic circuits inside the electronic cassettes and image quality is dropped.

As technologies for solving this problem, in Japanese Patent Application Laid-Open Publication (JP-A) No. 2000-116633 and JP-A No. 2003-194951, there are described technologies that control the transmission of heat generated by the electronic circuit to the radiation detector by disposing a shield member between the electronic circuit and the radiation detector or by disposing a heat dissipating component that transmits heat generated by the electronic circuit to a casing of the electronic cassette in an electrically insulated state.

Further, in JP-A No. 10-177224, there is described a technology where a ventilation opening and a fan are disposed in a casing of an X-ray shooting device and air is allowed to pass through the ventilation opening to cool the entire device.

Further, in JP-A No. 2002-311526, there is described a technology where a lid that is capable of opening and closing a casing of an electronic cassette is disposed, a heat absorbing member is detachably provided at the inside of the casing, and heat is absorbed by the heat absorbing member.

Moreover, in JP-A No. 2006-102492, there is described a technology where a storage container is manufactured in a dimension such that an electronic cassette is capable of being housed therein and the temperature of the storage container is adjusted to a desired temperature.

However, although the technologies described in JP-A No. 2000-116633 and JP-A No. 2003-194951 can control a drop in image quality resulting from the affect of heat emission from the electronic circuit when only a short amount of time is needed to drive the electronic cassette, heat also reaches the radiation detector as the temperature of the entire electronic cassette rises when a long amount of time is needed to drive the electronic cassette. Therefore, these technologies cannot control a drop in image quality resulting from the affect of heat emission.

Further, sometimes electronic cassettes are used in operation sites, and it is demanded that electronic cassettes have a sealed structure because sterilization is performed in order to prevent blood-borne infections and the like. However, the technology described in JP-A No. 10-177224 cannot be given a sealed structure because its structure allows air to circulate through the ventilation opening, so this technology cannot be applied as an electronic cassette cooling mechanism.

Further, the technology described in JP-A No. 2002-311526 is complicated because it is necessary to manually replace the heat absorbing member inside the casing. Therefore, as the casing of the electronic cassette is opened and closed, deterioration of the sealed structure of the electronic cassette becomes a problem.

Moreover, the technology described in JP-A No. 2006-102492 is convenient but its structure is complex and expensive. Further, although it is good that numerous electronic cassettes can be used alternately in order as in the embodiment in JP-A No. 2006-102492, when one or two electronic cassettes are repeatedly used, the electronic cassettes cannot be sufficiently cooled, and sometimes a drop in image quality resulting from the affect of heat emission cannot be controlled.

SUMMARY

The present invention has been made in consideration of the above-described circumstances and provides a cooling device and a cooling method that can cool an electronic device in a short amount of time.

One aspect pertaining to the present invention is a cooling device comprising: a housing component that is configured to accommodate a portable electronic device therein; and a heat absorbing component that performs heat absorption by bringing a heat absorber into contact with the electronic device when the electronic device is accommodated in the housing component.

BRIEF DESCRIPTION OF THE DRAWINGS

An exemplary embodiment of the present invention will be described in detail based on the following figures, wherein.

DETAILED DESCRIPTION

Below, an exemplary embodiment of the present invention will be described in detail with reference to the drawings.

Figure 1:
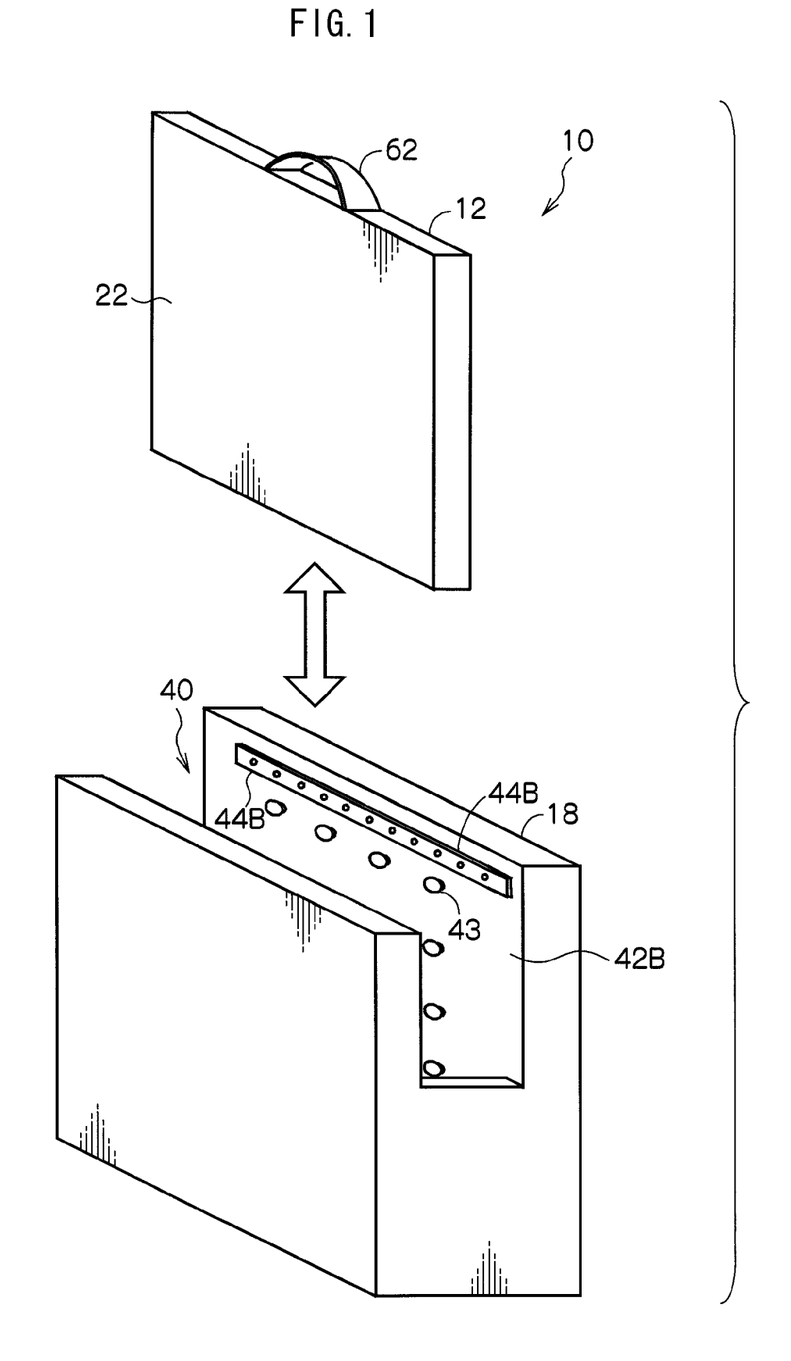
FIG. 1 is a diagram showing the general configuration of an electronic cassette and a housing device pertaining to the exemplary embodiment.

In FIG. 1, there is shown a radiological image shooting system 10 that is equipped with an electronic cassette 12 pertaining to the present exemplary embodiment.

The radiological image shooting system 10 is configured to include: the electronic cassette 12 that is portable and, each time it is irradiated with radiation that carries image information, is capable of generating, accumulating and storing that image information in image data; and a housing device 18 that houses the electronic cassette 12, charges the housed electronic cassette 12, and cools the housed electronic cassette 12.

Figure 2A:
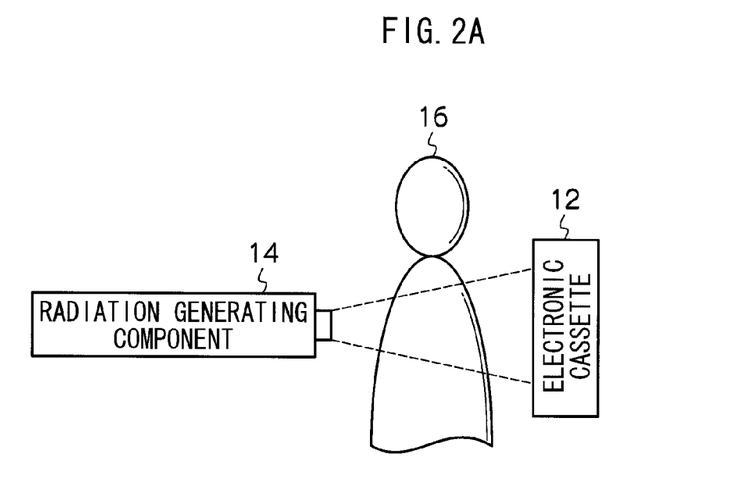
FIG. 2A is a general diagram showing the disposition of the electronic cassette during shooting of a radiological image.

As shown in FIG. 2A, the electronic cassette 12 is disposed a distance away from a radiation generating component 14 that generates radiation such as X rays during shooting of a radiological image. The space between the radiation generating component 14 and the electronic cassette 12 at this time serves as a shooting position for a subject 16 to be positioned in. When shooting of a radiological image is instructed, the radiation generating component 14 emits radiation of a radiation quantity corresponding to a shooting condition or the like that has been given beforehand. The radiation that has been emitted from the radiation generating component 14 carries image information as a result of being transmitted through the subject 16 positioned in the shooting position, and thereafter the electronic cassette 12 is irradiated with the radiation.

Figure 2B:
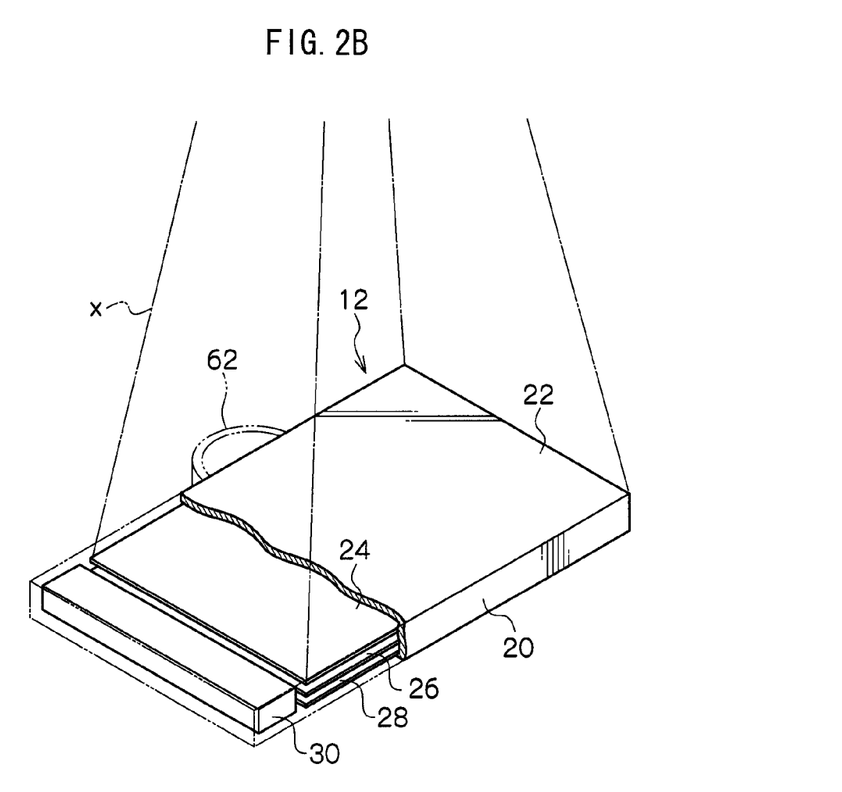
FIG. 2B is a perspective diagram showing the internal structure of the electronic cassette during shooting of a radiological image.

As shown in FIG. 2B, the electronic cassette 12 is covered by a flat plate-shaped casing 20 that has a thickness and comprises a material that allows radiation of X rays to be transmitted therethrough. A grip portion 62 is disposed on a specific side surface of the casing 20 so that the electronic cassette 12 can be carried by hand.

Inside the casing 20, there are disposed, in order from an irradiated surface 22 side of the casing 20 that is irradiated by X rays, a grid 24 that removes scattered radiation of the X rays that arises in conjunction with the X rays being transmitted through the subject 16, a radiation detector (radiation detection panel) 26 that detects the X rays, and a lead plate 28 that absorbs back scattered radiation of X rays. It will be noted that the irradiated surface 22 of the casing 20 may also be configured by the grid 24. Further, the radiation detector 26 may, for example, be a direct conversion detector that directly converts the X rays into electric charges at a semiconductor layer comprising non-crystalline amorphous selenium (a-Se) whose main component (e.g., having a content percentage equal to or greater than 50%) is selenium and that accumulates those electric charges, or may be an indirect conversion detector that converts the X rays into light with a scintillator such as gadolinium oxysulfide (GOS) or cesium iodide (CsI), then converts the converted light into electric charges with an electric conversion element (photodiode) and accumulates those electric charges.

Further, a case 30 that houses an electronic circuit including a microcomputer and a chargeable secondary battery is disposed at one end side of the inside of the casing 20. The radiation detector 26 and the electronic circuit are actuated by electrical power supplied from the secondary battery disposed in the case 30. It is desirable for a lead plate or the like to be disposed at the irradiated surface 22 side of the case 30 in order to avoid a situation where the various circuits housed inside the case 30 sustain damage in conjunction with irradiation of X rays.

Further, the electronic cassette 12 is configured to be capable of being charged without contact utilizing electromagnetic induction between the electronic cassette 12 and the housing device 18 in a state where the electronic cassette 12 has been housed in the housing device 18. The electronic cassette 12 is configured such that the battery housed in the case 30 is capable of being charged as a result of electrical power being induced by electromagnetic induction when the electronic cassette 12 has been housed in the housing device 18. It will be noted that, in the present exemplary embodiment, the electronic cassette 12 is configured to be charged without contact utilizing electromagnetic induction, but the electronic cassette 12 may also be configured such that, for example, by disposing a near-infrared lamp in the housing device 18, irradiating the electronic cassette 12 with laser light and receiving the laser light with a photodiode disposed in the housing device 18, the electronic cassette 12 is charged without contact utilizing light energy.

Figure 3:
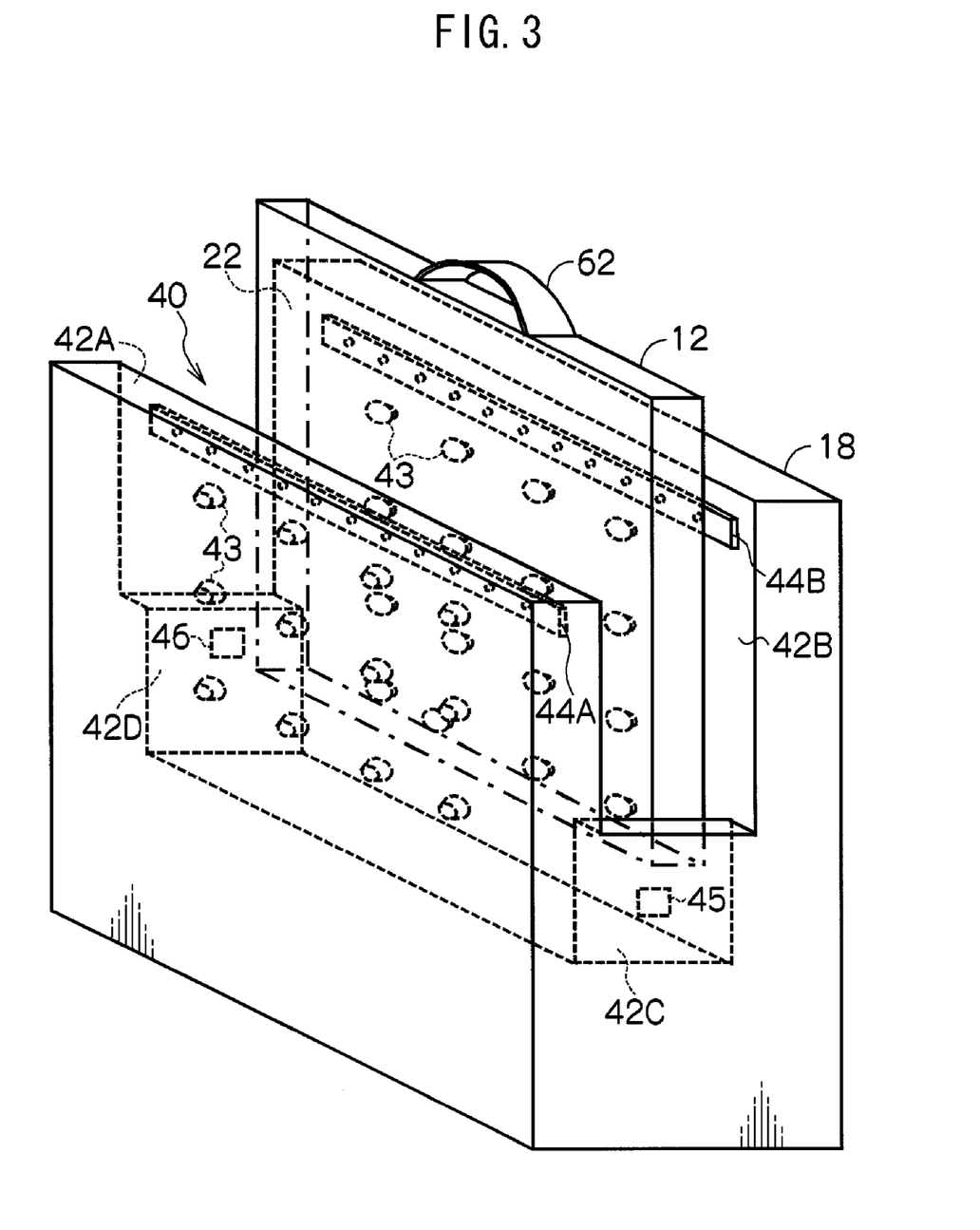
FIG. 3 is a transparent perspective diagram showing a state where the electronic cassette pertaining to the exemplary embodiment is housed in the housing device.
Figure 4:
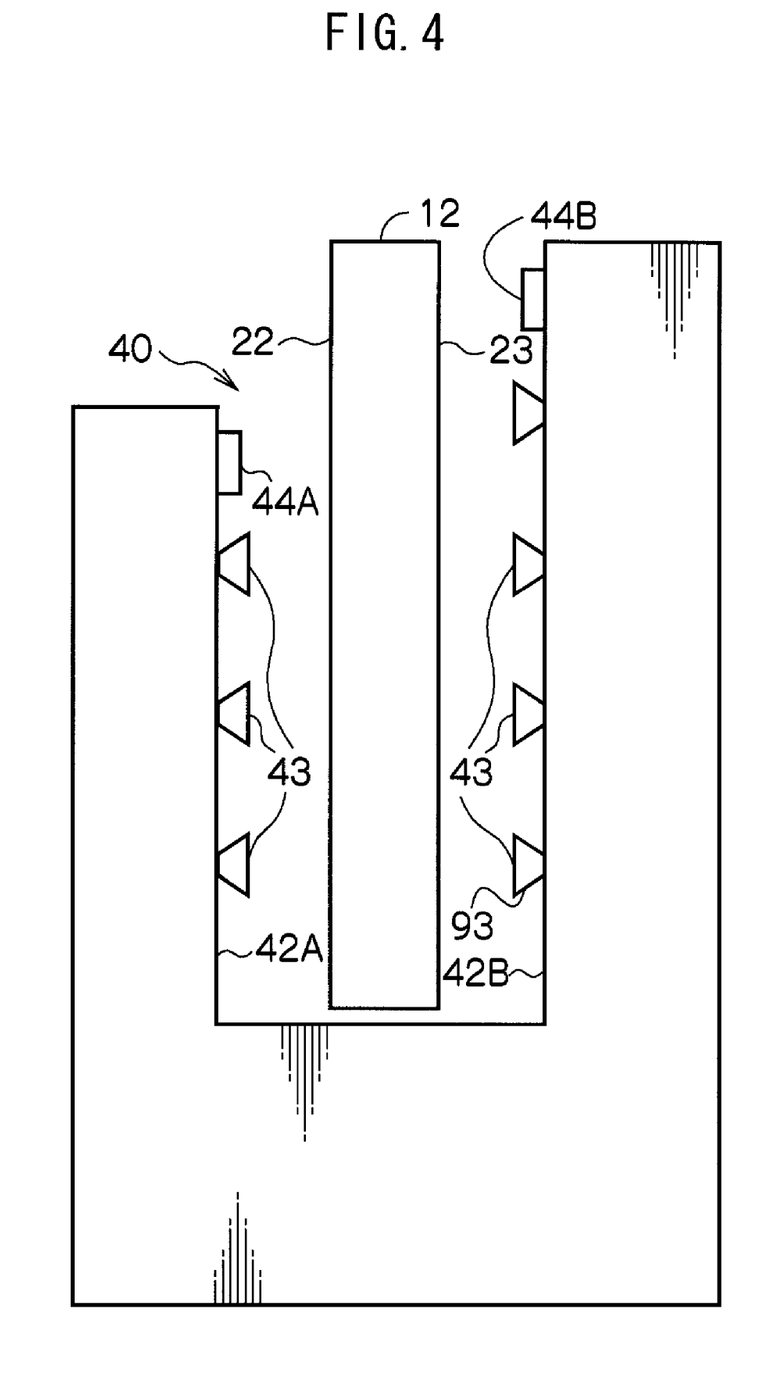
FIG. 4 is a cross-sectional diagram showing a state where the electronic cassette pertaining to the exemplary embodiment is housed in the housing device.

As shown in FIG. 1, a housing component 40 which accommodate the electronic cassette 12 is configured in the housing device 18. As shown in FIG. 3 and FIG. 4, in this housing component 40, numerous nozzles 43 that spray a vaporized cooling liquid onto the electronic cassette 12 are two-dimensionally disposed on two inside surfaces 42A and 42B that respectively face the irradiated surface 22 of the electronic cassette 12 and a back surface 23 of the electronic cassette 12 that becomes the back side of the irradiated surface 22 in a state where the electronic cassette 12 has been accommodated in the housing component 40.

Further, blowers 44A and 44B that blow air are disposed in the vicinity of an entrance in the upper portion of the inside surfaces 42A and 42B of the housing component 40.

Moreover, an optical sensor 45 that emits light and detects whether or not the electronic cassette 12 has been housed in the housing component 40 on the basis of a change in the reflectivity of the emitted light is disposed on one longitudinal direction inside surface 42C of the housing component 40, and an electrical power supplying component 46 that supplies electrical power by electromagnetic induction to the electronic cassette 12 is disposed in another longitudinal direction inside surface 42D of the housing component 40. It will be noted that, in the present exemplary embodiment, an optical sensor is used as the sensor 45, but a mechanical switch may also be used as the sensor 45.

Figure 5:
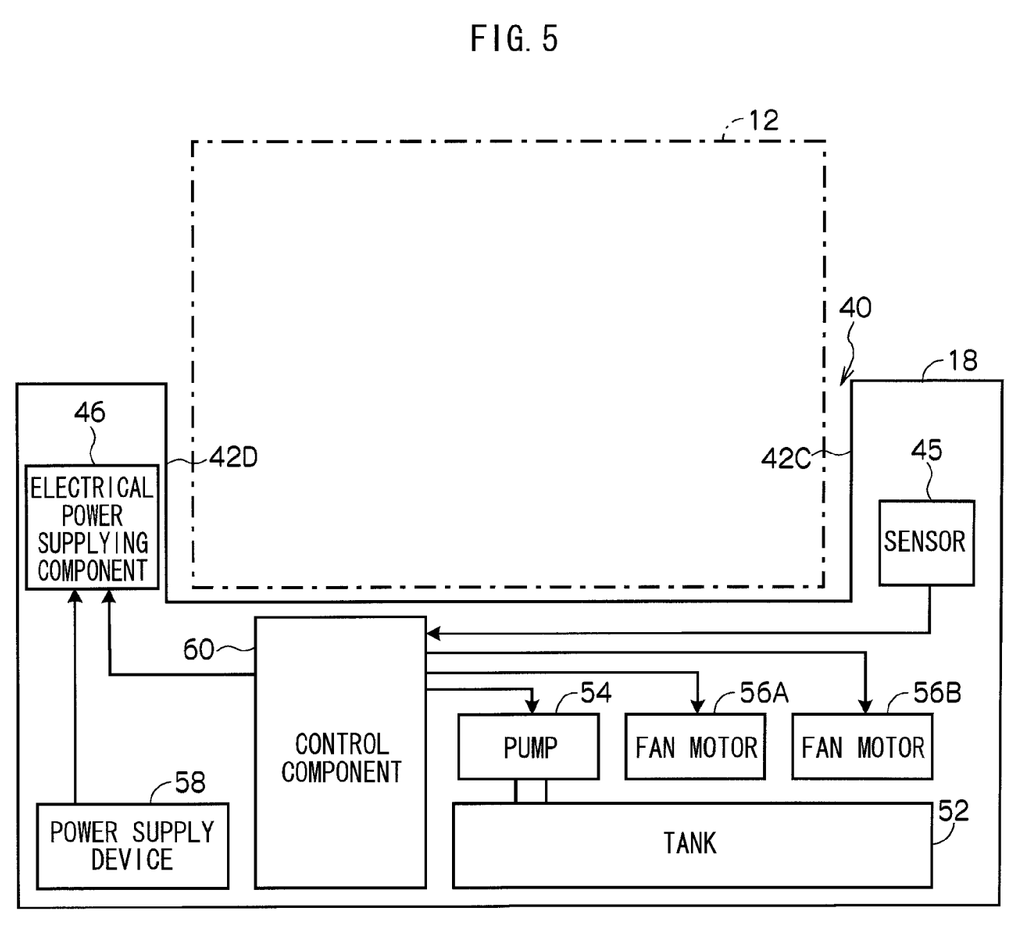
FIG. 5 is a block diagram showing the configuration of the housing device pertaining to the exemplary embodiment.

In FIG. 5, there is shown the configuration of the housing device 18 pertaining to the present exemplary embodiment.

The housing device 18 is further equipped with a tank 52 that stores the cooling liquid, a pump 54 for feeding the cooling liquid stored in the tank 52 to each of the nozzles 43, two fan motors 56A and 56B, a power supply device 58 that is connected to an external power supply, and a control component 60 that controls operation of the entire components in the housing device 18. It will be noted that, in the present exemplary embodiment, an antiseptic liquid including alcohol is stored in the tank 52 as the cooling liquid.

The housing device 18 pertaining to the present exemplary embodiment is configured to be capable of spraying air individually from the blowers 44A and 44B. Air is sprayed from the blower 44A when the fan motor 56A is driven to rotate an unillustrated fan, and air is sprayed from the blower 44B when the fan motor 56B is driven to rotate an unillustrated fan.

The sensor 45, the pump 54, the fan motors 56A and 56B and the electrical power supplying component 45 are connected to the control component 60. The control component 60 is realized by a microcomputer and controls the driving of the pump 54 and the fan motors 56A and 56B and the generation of electromagnetic waves by the electrical power supplying component 46. Further, the control component 60 detects whether or not the electronic cassette 12 has been housed in the housing component 40 on the basis of a signal from the sensor 45.

The various devices and elements (the sensor 45, the electrical power supplying component 46, the pump 54, the fan motors 56A and 56B, and the microcomputer that functions as the control component 60) provided in the housing device 18 are actuated by electrical power supplied from the power supply device 58.

Next, the operation of the housing device 18 pertaining to the present exemplary embodiment will be described.

When shooting a radiological image, the subject 16 is disposed between the radiation generating component 14 and the electronic cassette 12, and radiation is emitted from the radiation generating component 14.

The radiation that has been emitted from the radiation generating component 14 is transmitted through the subject 16 and reaches the electronic cassette 12.

Thus, image information representing a radiological image represented by the irradiated radiation is generated and stored in the electronic cassette 12. Further, the electronic cassette 12 emits heat in its built-in electronic circuit when generating the image information.

The electronic cassette 12 is housed in the housing component 40 of the housing device 18 when performing cooling and when performing charging.

When the sensor 45 detects that the electronic cassette 12 has been housed in the housing component 40, the control component 60 performs later-described cooling control processing to cool the electronic cassette 12. Further, the control component 60 causes the electrical power supplying component 46 to generate electromagnetic waves and charge the battery of the electronic cassette 12 by electromagnetic induction.

Figure 6:
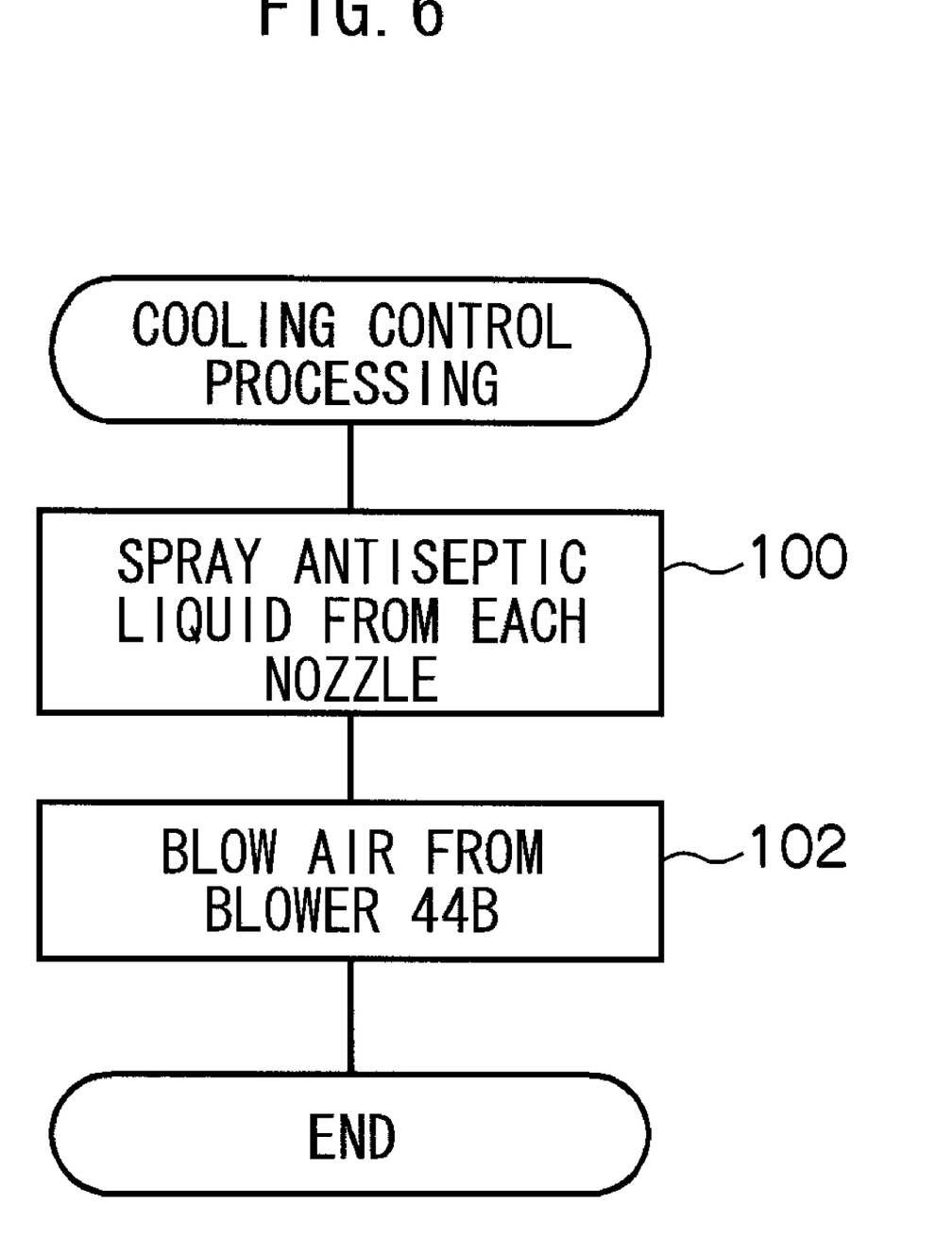
FIG. 6 is a flowchart showing a flow of cooling control processing pertaining to the exemplary embodiment.

In FIG. 6, there is shown a flow of cooling control processing that is executed by the control component 60.

In step 100, the pump 54 is driven to spray a vaporized antiseptic liquid stored in the tank 52 from each of the nozzles 43. The amount of time during which this antiseptic liquid is to be sprayed may be set as a fixed amount of time that has been determined beforehand or, for example, a temperature sensor that detects the temperature of the electronic cassette 12 may be disposed inside the housing component 40, and the amount of time during which the antiseptic liquid is to be sprayed may be lengthened the higher the temperature of the electronic cassette 12 detected by the temperature sensor is. Moreover, the temperature detection may be realized by a non-contact thermometer that detects infrared radiation, and the antiseptic liquid may continue to be sprayed from each of the nozzles 43 until the surface temperature of the electronic cassette 12 falls to a constant temperature. Further, wireless communication means may be disposed in the electronic cassette 12 and in the housing component 40, a temperature sensor may be built into the electronic cassette 12, and the electronic cassette 12 may receive and utilize the detection result of the temperature sensor using the wireless communication means.

Figure 7:
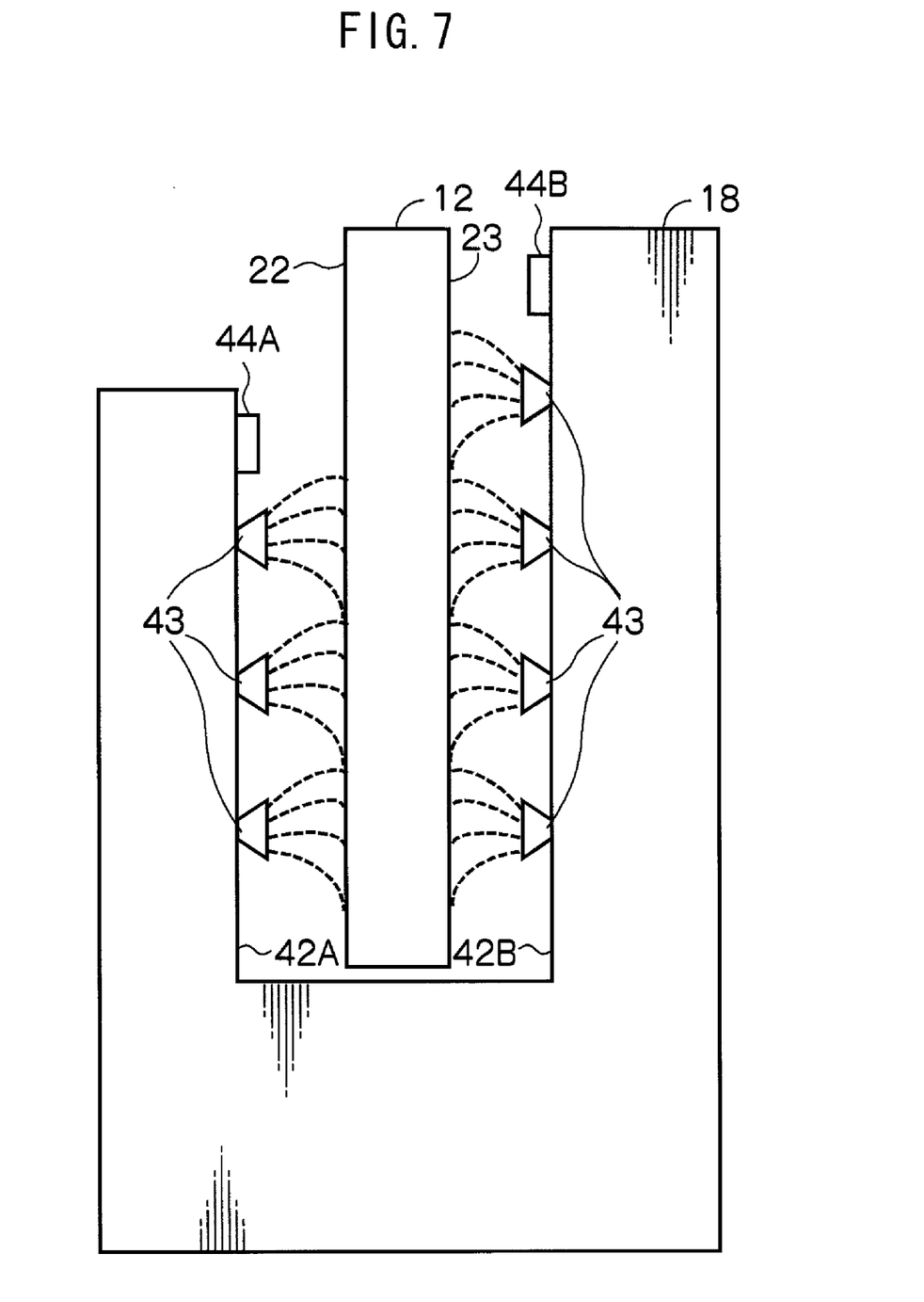
FIG. 7 is a diagram showing an antiseptic liquid being sprayed from nozzles of the housing device pertaining to the exemplary embodiment.

In FIG. 7, there is shown the antiseptic liquid being sprayed from the nozzles 43 onto the electronic cassette 12. It will be noted that the antiseptic liquid is indicated by dotted lines in FIG. 7.

By spraying the antiseptic liquid onto the electronic cassette 12 in this manner, the electronic cassette 12 can be cooled by the temperature of the antiseptic liquid itself and by heat absorption when the antiseptic liquid vaporizes.

In the next step 102, the fan motor 56B is driven to cause air to be blown from the blower 44B, and then processing ends. The amount of time during which the air is to be blown from this blower 44B may be set as a fixed amount of time that has been determined beforehand or, for example, the amount of time during which the air is to be blown from the blower 44B may be lengthened the higher the temperature of the electronic cassette 12 is or the larger the amount of the cooling liquid that has been sprayed is. In this case also, the temperature detection may be realized by a non-contact thermometer that detects infrared radiation, and the air may be blown from the blower 44B until the surface temperature of the electronic cassette 12 falls to a constant temperature. Further, wireless communication means may be disposed in the electronic cassette 12 and in the housing component 40, a temperature sensor may be built into the electronic cassette 12, and the electronic cassette 12 may receive and utilize the detection result of the temperature sensor using the wireless communication means.

Figure 8:
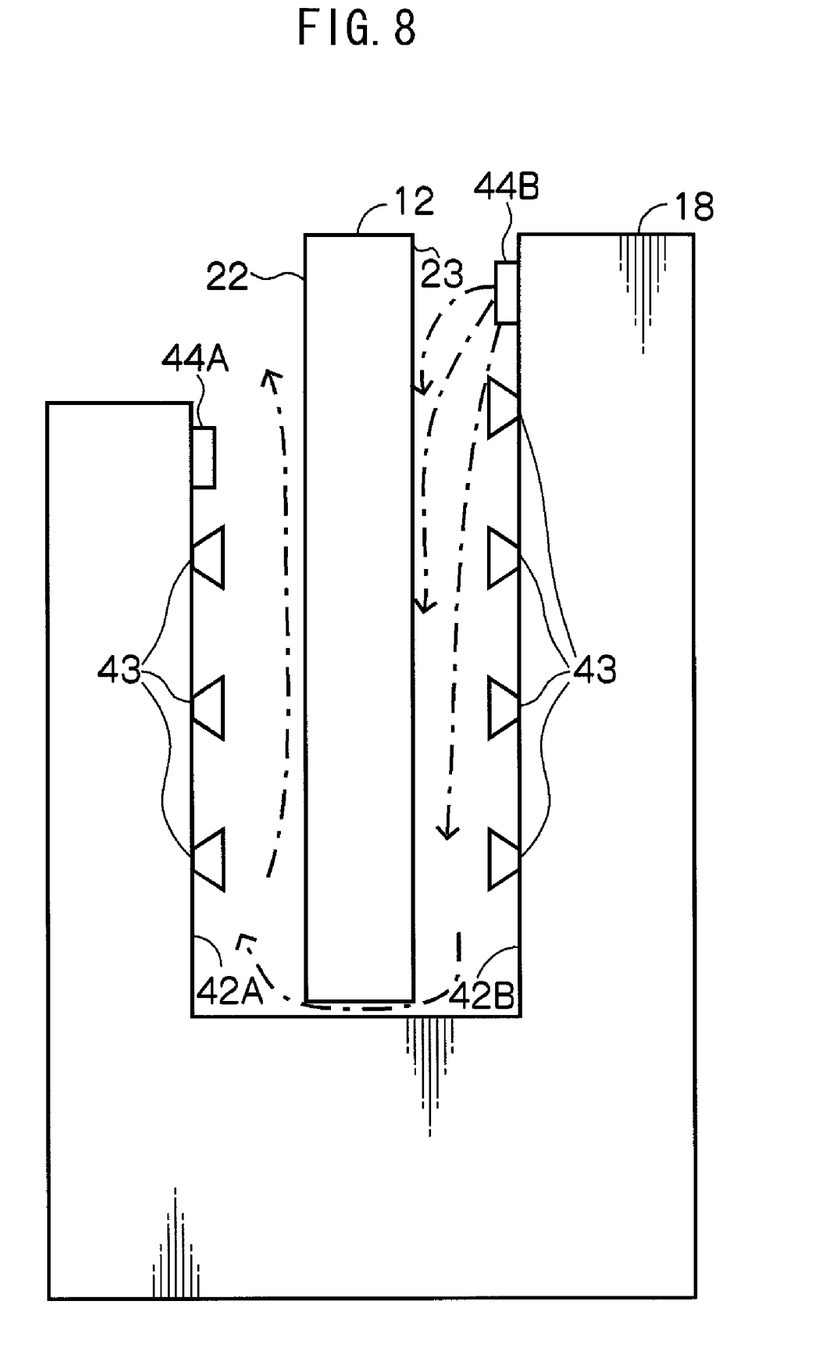
FIG. 8 is a diagram showing air being blown from a blower 44B of the housing device pertaining to the exemplary embodiment.

In FIG. 8, there is shown air being blown from the blower 44B onto the electronic cassette 12. It will be noted that the flow of air is indicated by a one-dotted chain line in FIG. 8.

By causing air to be blown from the blower 44B and circulate around the electronic cassette 12 in this manner, vaporization of the antiseptic liquid adhering to the electronic cassette 12 can be quickened.

Figure 10:
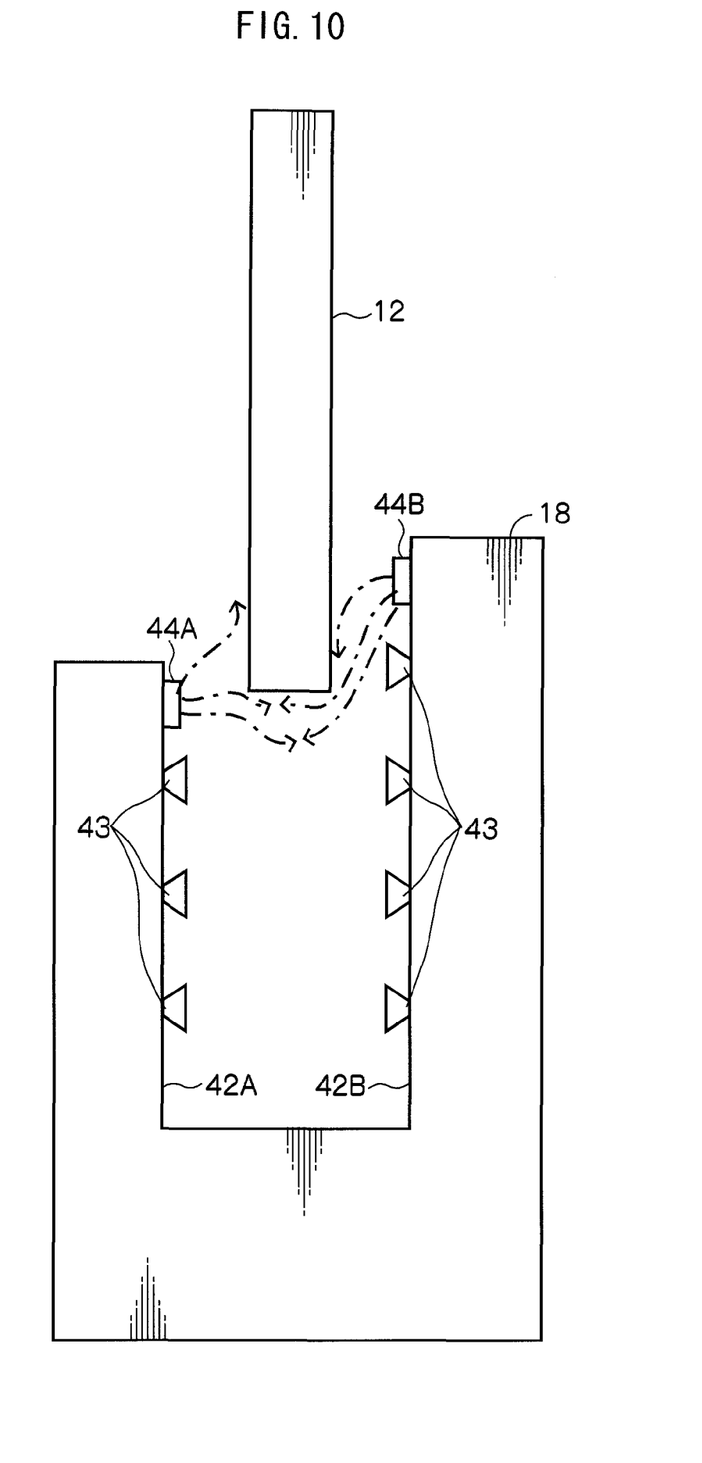
FIG. 10 is a diagram showing the electronic cassette pertaining to the exemplary embodiment being removed from the housing device.

The electronic cassette 12 that has been accommodated in the housing device 18 is removed from the housing device 18 as needed, such as when shooting a radiological image.

When the sensor 45 detects that the electronic cassette 12 has been removed, the control component 60 performs later-described removal control processing.

Figure 9:
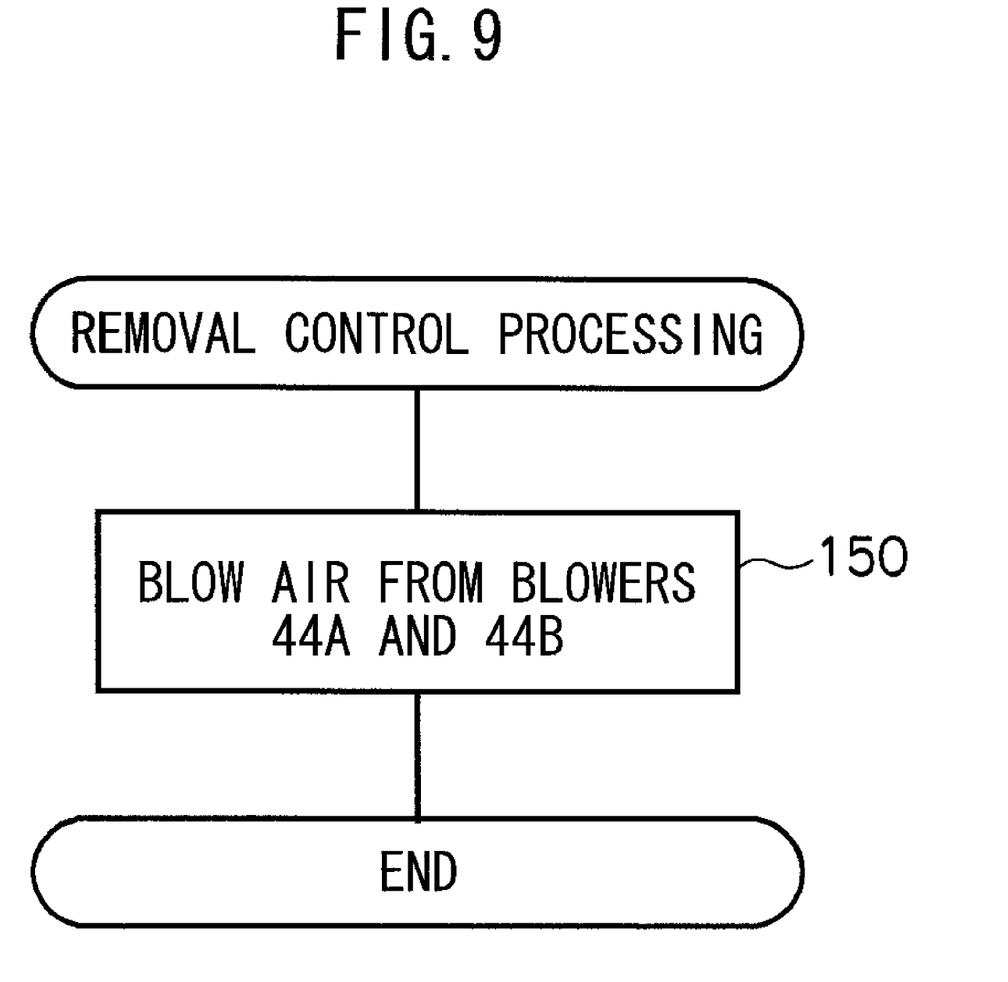
FIG. 9 is a flowchart showing a flow of removal control processing pertaining to the exemplary embodiment.

In FIG. 9, there is shown a flow of removal control processing that is executed by the control component 60.

In step 150, the fan motor 56A and the fan motor 56B are driven for a predetermined amount of time to cause air to be blown from the blower 44A and the blower 44B, and then processing ends.

By causing air to be blown from the blower 44A and the blower 44B when the electronic cassette 12 is removed in this manner, the residual antiseptic liquid adhering to the electronic cassette 12 can be blown off to be removed.

As described above, according to the present exemplary embodiment, the housing device 18 performs heat absorption by spraying the antiseptic liquid from the nozzles 43 onto the electronic cassette 12 when the electronic cassette 12 has been accommodated in the housing device 18, so the housing device 18 can cool the electronic cassette 12 in a short amount of time.

Further, according to the present exemplary embodiment, the housing device 18 uses the antiseptic liquid as the cooling liquid, so the housing device 18 can sterilize the electronic cassette 12 at the same time as when it cools the electronic cassette 12. Further, because the housing device 18 uses the antiseptic liquid as the cooling liquid, the antiseptic liquid is safe for the human body even if the antiseptic liquid remains adhering to the electronic cassette 12. Further, when the antiseptic liquid includes alcohol, its volatility is high, so its cooling efficiency is good.

In the preceding exemplary embodiment, spraying of an antiseptic liquid as the cooling liquid by the housing device 18 has been described. However, the present invention is not limited to this exemplary embodiment and may also be configured such that the housing device 18 sprays water, saline solution, or normal saline solution. It is preferable for the cooling liquid to have no toxicity and to have high volatility. Further, as a heat absorber, instead of the cooling liquid, a Peltier device or a bag body that envelops a gelatinous heat absorbing substance may also be brought into contact with the electronic cassette 12 to perform cooling.

Further, in the preceding exemplary embodiment, the housing device 18 spraying the antiseptic liquid onto the entire surfaces of the irradiated surface 22 and the back surface 23 of the electronic cassette 12 has been described. However, the present invention is not limited to this exemplary embodiment and may also be configured such that, for example, the housing device 18 sprays the antiseptic liquid onto a region of the electronic cassette 12 where the electronic circuit (the case 30) that emits heat is disposed. Thus, the housing device 18 can efficiently cool just the portion that emits heat.

Further, in the preceding exemplary embodiment, the housing device 18 charging and cooling the electronic cassette 12 has been described. However, the present invention is not limited to this exemplary embodiment and may also be configured such that, for example, the housing device 18 performs wireless communication by laser light with the electronic cassette 12 and receives radiological image data. The wireless communication is not limited to laser light and may also be performed using infrared light, for example. Further, the wireless communication may also be performed by a wireless LAN, Bluetooth, ultra-wideband (UWB), or millimeter wave communication. Moreover, the housing device 18 may also be connected to the electronic cassette 12 by a terminal or the like such that at least one of supply of electrical power and communicating image data is performed.

Further, when ultraviolet (UV) irradiating means (a UV LED, a UV lamp) are disposed on the inside surfaces 42A and 42B, the antiseptic effect resulting from the alcohol can be raised even more. When irradiation is performed by detecting that the electronic cassette 12 has been housed in the housing component 40, this is effective for sterilizing the surface of the electronic cassette 12 and needless power consumption can be controlled. When the inside of the housing device 18 is irradiated in conjunction with the startup of the shooting system, the inside of the housing device 18 can be kept clean at times other than when the electronic cassette 12 is loaded therein. Irradiation and stopping may also be periodically repeated.

In addition, the configuration of the radiological image shooting system 10 and the configurations of the electronic cassette 12 and the housing device 18 (see FIG. 1 to FIG. 5, FIG. 7, FIG. 8 and FIG. 10) that have been described in the present exemplary embodiment are only examples and, it goes without saying, are appropriately alterable within a range that does not depart from the gist of the present invention.

Further, the flows of cooling control processing and removal control processing (see FIG. 6 and FIG. 9) that have been described in the present exemplary embodiment are also only examples and, it goes without saying, are appropriately alterable within a range that does not depart from the gist of the present invention.

What is claimed is:

1. A cooling device comprising:
   a housing component that is configured to accommodate a portable electronic device therein;
   a heat absorbing component that performs heat absorption by bringing a heat absorber into contact with the electronic device when the electronic device is accommodated in the housing component; and
   a connecting component that is electrically connected to the electronic device when the electronic device is accommodated in the housing component such that at least one of supply of electrical power to the electronic device and communication with the electronic device is performed; wherein
   the heat absorbing component is a spraying component that sprays a vaporized cooling liquid, which is the heat absorber, onto the electronic device; and wherein
   the cooling liquid is an antiseptic liquid.

2. The cooling device according to claim 1, further comprising a blower that blows air onto the electronic device after the cooling liquid has been sprayed from the spraying component.

3. The cooling device according to claim 1, wherein the electronic device includes a built-in electronic circuit that emits heat when it is driven, and the heat absorbing component brings the heat absorber into contact with a region of the electronic device where the electronic circuit is disposed.

4. The cooling device according to claim 1, wherein the electronic device is a portable radiological image conversion device that includes a built-in radiation detection panel having sensitivity to radiation or light obtained by converting radiation into light and generates image data representing a radiological image expressed by radiation irradiated to the radiation detection panel.

5. The cooling device according to claim 1, further comprising an electrical power supply component that supplies electrical power to the electronic device by electromagnetic induction or light energy when the electronic device is accommodated in the housing component.

6. The cooling device according to claim 1, further comprising a sensor that detects whether or not the electronic device is accommodated in the housing component.

7. A cooling method performed with respect to a portable electronic device that is accommodated in a housing component, the method comprising: detecting that the electronic device has been housed in the housing component; performing heat absorption by spraying an antiseptic cooling liquid onto the electronic device; and blowing air onto the electronic device after the antiseptic cooling liquid has been sprayed.

8. The cooling method according to claim 7, wherein the amount of time during which the antiseptic cooling liquid is to be sprayed is set to a fixed amount of time determined beforehand or is set according to the temperature of the electronic device.

9. The cooling method according to claim 7, wherein the amount of time during which the air is to be blown is set to a fixed amount of time determined beforehand or is set according to the temperature of the electronic device.

10. The cooling method according to claim 7, further comprising detecting that the electronic device has been removed from the housing component, and further blowing air onto the electronic device in order to remove residual antiseptic cooling liquid adhering to the electronic device.

* * * * *